United States Patent
Menz et al.

(10) Patent No.: US 10,031,480 B2
(45) Date of Patent: Jul. 24, 2018

(54) METHOD FOR PRODUCING SECURITY ELEMENTS BY THE INDIVIDUALIZATION OF VOLUME HOLOGRAMS AND SECURITY ELEMENTS PRODUCED THEREWITH

(75) Inventors: Irina Menz, Grasbrunn (DE); Philippe Huet, Saint Geneviève des Bois (FR)

(73) Assignee: Hologram Industries Research GmbH, Pliening-Ottersberg (DE)

( * ) Notice: Subject to any disclaimer, the term of this patent is extended or adjusted under 35 U.S.C. 154(b) by 189 days.

(21) Appl. No.: 12/866,217

(22) PCT Filed: Feb. 4, 2009

(86) PCT No.: PCT/DE2009/000147
§ 371 (c)(1),
(2), (4) Date: Oct. 26, 2010

(87) PCT Pub. No.: WO2009/097838
PCT Pub. Date: Aug. 13, 2009

(65) Prior Publication Data
US 2011/0049864 A1 Mar. 3, 2011

(30) Foreign Application Priority Data
Feb. 4, 2008 (DE) .................. 10 2008 007 620

(51) Int. Cl.
*B42D 15/00* (2006.01)
*B42D 15/10* (2006.01)
(Continued)

(52) U.S. Cl.
CPC .............. *G03H 1/18* (2013.01); *B42D 25/29* (2014.10); *G03H 1/0256* (2013.01);
(Continued)

(58) Field of Classification Search
CPC ........ B42D 15/00; B42D 15/10; B42D 25/29; B42D 25/47; B42D 25/324; B42D 25/328;
(Continued)

(56) References Cited

U.S. PATENT DOCUMENTS

| | | | | |
|---|---|---|---|---|
| 5,588,679 A | * | 12/1996 | Skov | ................... G09F 3/0292 283/101 |
| 5,797,632 A | * | 8/1998 | Rice | ........................ B31F 1/07 283/114 |

(Continued)

FOREIGN PATENT DOCUMENTS

| WO | WO 2006021102 A1 * | 3/2006 | ........... G03H 1/0011 |
|---|---|---|---|
| WO | WO 2007131375 A1 * | 11/2007 | ........... G02B 5/0221 |
| WO | 2007/131496 A | 9/2017 | |

OTHER PUBLICATIONS

International Search Report from International Application Publication No. WO 2009/097838.

*Primary Examiner* — Justin V Lewis
(74) *Attorney, Agent, or Firm* — Lisa V. Mueller; Casimir Jones, S.C.

(57) ABSTRACT

When coating a document surface (3) having relief-like information (1) carrying personal data, for example, with a monomer-containing liquid UV adhesive (4) across the entire surface and then laminating thereon a volume hologram (2), the varying adhesive thicknesses between the volume hologram and the document surface resulting from the relief cause differentiated swelling and thereby a differentiated color shift of the hologram. After the desired color shift is achieved, the UV adhesive (4) is completely cured. In this way, individual holographic information is obtained, which is located exactly above the relief-like information of the document. With this method, holographic overlays comprising personal data and a passport picture can be produced, (Continued)

and it is possible to link defined optical document information to the hologram in an accurately positioned manner, so that information is visible both non-diffractively and, from a different viewing angle, holographically in a different color.

17 Claims, 1 Drawing Sheet

(51) Int. Cl.
| | |
|---|---|
| *B32B 3/00* | (2006.01) |
| *B32B 15/00* | (2006.01) |
| *B44C 1/17* | (2006.01) |
| *B41M 5/00* | (2006.01) |
| *G03G 7/00* | (2006.01) |
| *B32B 7/14* | (2006.01) |
| *G03H 1/18* | (2006.01) |
| *G03H 1/02* | (2006.01) |
| *B42D 25/29* | (2014.01) |
| *G03H 1/00* | (2006.01) |
| *G03H 1/22* | (2006.01) |
| *B42D 25/324* | (2014.01) |
| *B42D 25/328* | (2014.01) |
| *B42D 25/47* | (2014.01) |

(52) U.S. Cl.
CPC .......... *B42D 25/324* (2014.10); *B42D 25/328* (2014.10); *B42D 25/47* (2014.10); *G03H 1/0011* (2013.01); *G03H 1/0236* (2013.01); *G03H 1/0248* (2013.01); *G03H 2001/186* (2013.01); *G03H 2001/2231* (2013.01); *G03H 2001/2263* (2013.01); *G03H 2210/54* (2013.01); *G03H 2250/35* (2013.01); *G03H 2250/40* (2013.01); *G03H 2250/44* (2013.01); *G03H 2260/12* (2013.01); *G03H 2260/34* (2013.01)

(58) Field of Classification Search
CPC ...... G09C 3/00; G03H 1/0011; G03H 1/0248; G03H 1/0256; G03H 1/18; G03H 2260/12; G03H 2001/2231; G03H 2260/34; G03H 2210/54; G03H 2250/44; G03H 2001/186; G03H 2001/2263; G03H 2250/40; G03H 1/0236; G03H 2250/35
USPC ........ 283/61, 62, 67, 70, 72, 74, 94, 95, 98, 283/101, 109; 428/156, 161, 164, 195.1, 428/203, 209
See application file for complete search history.

(56) References Cited

U.S. PATENT DOCUMENTS

| | | | |
|---|---|---|---|
| 2006/0193021 A1* | 8/2006 | Ishimoto et al. | 359/2 |
| 2007/0241553 A1* | 10/2007 | Heim | B42D 25/355 283/91 |
| 2008/0136161 A1* | 6/2008 | Leenders | B41M 5/0029 283/94 |
| 2008/0164690 A1* | 7/2008 | Heierli | G03H 1/0011 283/87 |
| 2009/0098382 A1* | 4/2009 | Massa et al. | 428/402.24 |
| 2009/0179418 A1* | 7/2009 | Stalder | G02B 5/0221 283/85 |
| 2009/0262407 A1 | 10/2009 | Dausmann et al. | |
| 2010/0112458 A1* | 5/2010 | Knocke | 430/2 |

* cited by examiner

US 10,031,480 B2

METHOD FOR PRODUCING SECURITY ELEMENTS BY THE INDIVIDUALIZATION OF VOLUME HOLOGRAMS AND SECURITY ELEMENTS PRODUCED THEREWITH

CROSS-REFERENCE TO RELATED APPLICATIONS

This is the U.S. national stage entry of International Patent Application No. PCT/DE2009/000147, filed on Feb. 4, 2009, which claims priority to German Patent Application No. 10 2008 007 620.1, filed Feb. 4, 2008, the contents of all of which are hereby incorporated by reference.

The invention refers to a method for producing security elements by the individualization of volume holograms for the application on documents of value and personal documents, such as passports, identity cards, credit cards, as well as security elements produced by the method.

It is known that volume holograms, in particular reflection photopolymer holograms, swell in contact with monomer containing layers and changer their color and bandwidth due to an increase of the distance in the Bragg lattice plane, as described in DE 68 905 610 T2. The swelling is caused by movable monomers which diffuse into the holograms, and can be stopped for instance by UV light or heat due to onsetting polymerization, resulting in immovable macromolecules.

From WO 95/13568, it is known that reflection volume holograms on polymer basis, in case of longer contact with monomer-containing, light-cross-linkable color tuning films, can be enhanced in the diffraction efficiency thereof, and the chromacity of the holograms towards longer wavelengths can be shifted due to swelling of the holographic lattice planes. If this color tuning process is prematurely stopped in certain areas by light exposure through an optical mask, visible individual information can be integrated in the reflection hologram. After individualization, the color tuning film is again removed from the hologram.

DE 10 2006 023 159 A1 and WO 2007/131 496 A2 describes a method in which the monomer-containing, light-cross-linking swelling means is brought in contact with the full surface of the reflection volume hologram also in liquid form, for instance in the form of UV lacquers or adhesives which can be cured by light, and in which individual data are produced in the reflection hologram by light exposure of an optical mask, with the advantage that after final flood light exposure, the swelling means remains on the hologram. Normally, the personal data printed or laser-engraved are not situated on the document surface but in underlying substrate layers of the document so as to ensure safety, prevent manipulations and ensure longevity. The quality of hologram individualization during adhesion to the document also to a large extent depends on the cleanness and smoothness of the document surface, in addition to the imaging quality of the optical mask used. Dust particles, grooves and scratches, for instance, lead to uneven tuning which causes errors especially in the area of the individual holographic data generated by light exposure of the mask, e.g. in the passport photograph area.

DE 10 2006 048 768 A1 describes a color tuning method which does not require an optical mask. A liquid swelling means, e.g. a printable ink, is selectively applied to the reflection volume hologram by means of ink-jet printing and cured, after a certain exposure time during which monomers from the ink can diffuse into the hologram, by means of light or heat. The precision of the holographic information obtained in this manner, however, is limited since the ink can run until it has been fixated.

It is therefore the object of the invention to provide a method of the kind mentioned above and security elements produced therewith by means of which improved safety solutions for protecting documents of value and personal documents against fraud are provided.

This object is solved by a method having the features in claim 1 as well as by security elements having the features of claims 10 and 11. Advantageous embodiments are set out in the correspondingly dependent claims.

According to this method, for producing security elements by the individualization of volume holograms at the application on documents of value and personal documents, relief-like information is printed or embossed on the document surface in a first step, a liquid monomer-containing adhesive being applied on the entire document surface in a second step. The relief structure of the printed information results in an adhesive layer with different thickness distributions. After this, in a third step, a volume hologram film is laminated on top of the document surface coated with the liquid adhesive, and after a holding time during which the adhesive monomers diffuse into the hologram with different intensities in the relief area and the no-relief area, the adhesive composite is cured.

In this manner, diffractive information is produced which is located above one or more optical relief-like data on the document of value or the personal document at precisely the right positions. In this manner, a highest linkage degree of diffractive and non-diffractive information of the document is achieved which information shows a clearly visible color shifting effect.

The method according to the invention makes it possible to create individual diffractive information, such as personal data, without a sophisticated optical mask technique having to be used.

The invention is based on the observation that an homogeneously light exposed reflection volume hologram does not shift evenly if its entire surface is to be adhesively bonded, by a liquid monomer-containing adhesive, to a substrate with surface relief, caused e.g. by scratches or dust.

In the following, the invention is described more closely by means of embodiments with reference to the drawing.

Figure 1:
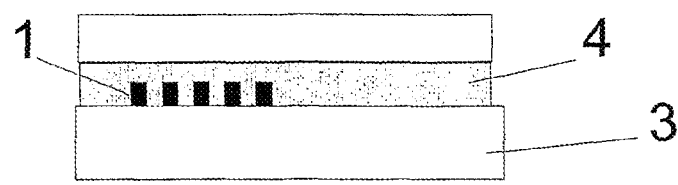
FIG. 1 shows a schematic cross-section of a first embodiment before diffusion.

As can be seen in FIG. 1, for producing a security element according to the invention, a piece of information 1 has been printed, for instance, with black ink or toner, on the document surface 3, preferably consisting of a plastic material such as PET, PC or PVC. For this purpose, all printing methods are suitable which generate a printing color relief on the plastic material which is high enough, advantageously >2 µm.

On top of this, a monomer-containing liquid adhesive 4, preferably a UV-curable adhesive, has been applied on the entire document surface, for instance by a silk-screen or a doctor blade technique, with a layer thickness in the range of from >2 to 30 µm, preferably 5-20 µm, and a volume hologram 2 has been laminated on top of this layer onto the document coated with the liquid adhesive. The volume hologram can be a holographically light exposed polymer film having a carrier foil. Advantageously, the light exposed hologram is a homogeneous diffuse reflection grid or a holographic mirror.

Due to the printed relief, the adhesive has different layer thicknesses between document and hologram surface. This means that the amount of adhesive monomer to be diffused into the holographic layer differs.

Figure 2:
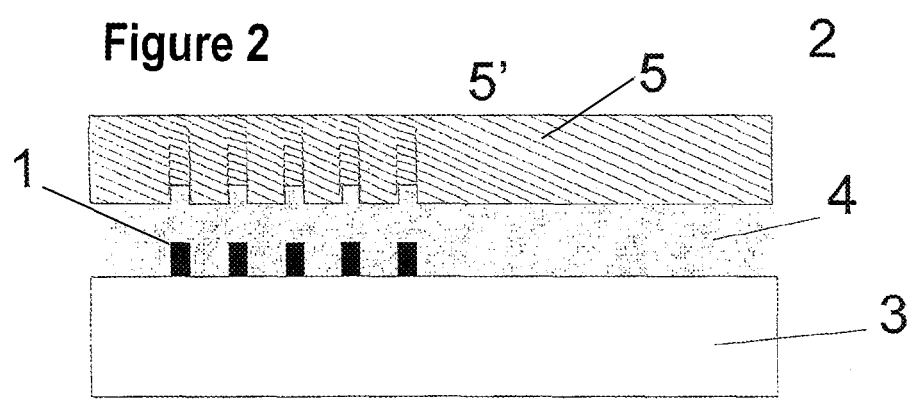
FIG. 2 shows the embodiment according to FIG. 1 in an additional step.

As shown in FIG. 2, the difference in the monomer amount caused the hologram to swell differently, which shows in a color change (color tuning) of the hologram after a few seconds to a few minutes due to a smaller change in distance of the Bragg lattice planes 5 over the printed relief than in the lattice planes 5 positioned over the areas with no relief. Thus, the hologram over the no-relief areas has been shifted more strongly into the long-wave spectral range than over the relief. After the desired color shift had been reached, the adhesive was cured over the entire surface, e.g. by means of UV light or heat.

It has proven advantageous if the printed raised relief consists of porous material, such as toner, which is used during laser printing and thermal transfer printing. Thus, a local depletion of monomers in the adhesive can be achieved which is due to diffusion of the monomer into the toner.

Although monomer concentration compensation processes within the adhesive layer and changes in potential pressure due to the dynamic increase in layer thickness of the hologram layer have to be taken into account, it is the more surprising how true to detail the achieved results are. Apparently, the adhesive monomer diffusion pressure in the polymer at the beginning of the diffusion process is so great that due to a depletion of monomer in the adhesive, the viscosity in the thinner adhesive areas increases faster and thus further monomer diffusion in the direction of the polymer decreases more markedly than in the thicker adhesive areas. For a mathematical interpretation of this three-dimensional dynamic diffusion system according to the second Fick's law, comprehensive measurements of the monomer concentrations in time and place would be necessary.

Figure 3:
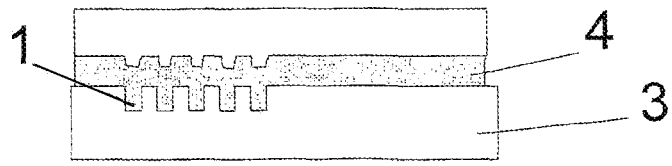
FIG. 3 shows a schematic cross-section of a second embodiment.

As is basically shown in FIG. 3, trials with intaglio printing, embossing and dot printing procedures, by means of which a negative relief can be produced in the document surface by heat and pressure, show that mainly the difference in adhesive layer thickness is responsible for the observed effect. In this case, the hologram is shifted into the long-wave spectral range to a lesser extent over the no-relief areas than over the negative relief.

For producing individualized holographic personal data, including the passport picture, the method according to the invention is advantageously carried out using transparent printing inks or toners, which however does not exclude the use of colored inks or toners.

For a meaningful comparative test of the laser-personalized data located in the card body of the document, against individual holographic data on the card surface, it is commonly desired for these two personal data sets to be located adjacent to each other on the document so that they can be better compared. For this purpose, first a transparent relief, consisting of the personal data and the negative portrait, is printed on the document surface, advantageously with the inkjet method with e.g. 300 dpi resolution using transparent inks or with the thermal transfer method with 600 dpi resolution using a transparent toner. This printed transparent relief is invisible to the user and does not covers the underlying document data and other optical features. After complete drying or fixation, respectively, of the printed relief by heat or light, the liquid adhesive is applied to the document surface and the hologram is laminated on top of it. After a few minutes, a differentiated shift in color of the hologram takes place. When the desired contrast in color has been achieved, the adhesive is completely cured by UV light or heat. Instead of the raised transparent print, the individual data can also embossed into the document surface. In this case, the positive portrait is embossed.

After this, the carrier foil of the adhesively bonded hologram film is removed. To increase scratch proofness and chemical stability of the holographic surface, surface protection lacquering or protective film lamination are performed subsequently.

A significant advantage of this method is that sophisticated mask light exposure technology prone to errors can be done without.

LIST OF REFERENCE NUMBERS 1. information
2. volume hologram
3. document surface (document)
4. adhesive
5. lattice plane
5'. lattice plane with change in distance

The invention claimed is:

1. A method for producing security elements in documents, comprising the following steps:
   (a) applying individualized relief information on or into the upper surface of the document by printing or embossing;
   (b) after this, applying a liquid monomer-containing adhesive to the entire upper surface of the document, whereby the structure of the relief information results in an adhesive layer with different thickness distributions;
   (c) laminating a volume hologram film on top of the document surface on which the relief information is applied and which is coated with the liquid monomer-containing adhesive, wherein the volume hologram film and the document surface are not in direct contact, and after a holding time, during which the adhesive monomers have diffused into the hologram film with different intensities in areas of the document having reliefs and areas not having reliefs, respectively, whereby the difference in the monomer intensities caused the hologram to swell to different extents in different areas and have led to color change, creating a diffractive information, curing the adhesive composite.

2. The method of claim 1, wherein the information applied by printing or embossing has relief heights or relief depths, respectively, of >2 μm.

3. The method of claim 1, wherein colored printing dyes, inks or toners with color pigments are used for the information applied by printing.

4. The method of claim 1, wherein transparent printing colors or toners are used for the information applied by printing.

5. The method of claim 1, wherein the information applied by printing includes printing dyes, inks or toners which reduce a content of diffusible adhesive monomers of the liquid adhesive layer between the volume hologram and a surface of the printed information.

6. The method of claim 1, wherein the relief information is embossed into the document surface with an embossing die.

7. The method of claim 1, wherein a monomer-containing, light-curing adhesive is used which is applied on the document surface in layer thicknesses of >2 μm, preferably 5-20 μm.

8. The method of claim 1, wherein after lamination of the volume hologram film onto the adhesive layer, adhesive curing by means of UV light or heat takes place only after a color change of the hologram has been achieved.

9. The method of claim 1, wherein the volume hologram film is a photopolymer film with holographic grid structures and at least one portion is a diffuse reflection grid or a holographic mirror.

10. A security element with a color tilting effect for protecting documents of value and personal documents against fraud, produced according to the method of claim 1, wherein the security element, with its diffractive information including a color tilting effect, is positioned exactly above the information printed with colored ink or toner or embossed on the document surface and its information content precisely corresponds to the printed or embossed information.

11. A security element with individual holographic personal data and passport picture for protecting documents of value and personal documents against fraud, produced by a method according to claim 1, wherein on the surface of the document, in a card body of which personalized data are located, a transparent relief, consisting of the personal data and a negative portrait, is located by printing and thereby does not cover underlying document data and other optical features, but causes respective diffractive information consisting of a color tilting effect.

12. The method of claim 1, wherein the information applied by printing includes porous toners.

13. The method of claim 1, wherein the volume hologram is a light exposed polymer film.

14. The method of claim 13, wherein the light exposed polymer film is a homogeneous diffuse reflection grid or a holographic mirror.

15. A method for producing security elements in documents, comprising the following steps:
(a) applying relief information on or into the upper surface of the document by printing or embossing;
(b) after this, applying a liquid monomer-containing adhesive to the entire upper surface of the document, whereby the structure of the relief information results in an adhesive layer with different thickness distributions;
(c) laminating a volume hologram film on top of the document surface on which the relief information is applied and which is coated with the liquid monomer-containing adhesive, wherein the volume hologram film and the document surface are not in direct contact, and after a holding time, during which the adhesive monomers have diffused into the hologram film with different intensities in areas of the document having reliefs and areas not having reliefs, respectively, whereby the difference in the monomer intensities caused the hologram to swell to different extents in different areas and have led to color change, creating a diffractive information, curing the adhesive composite so as to provide an individualized volume hologram with the holographic reproduction of the relief information on the document positioned exactly above the relief information.

16. A method for producing security elements in documents, comprising the following steps:
(a) applying individualized relief information on or into the upper surface of the document by printing with colored dyes, inks or toners with color pigments;
(b) after this, applying a liquid monomer-containing adhesive to an entire upper surface of the document, whereby a structure of the relief information results in an adhesive layer with different thickness distributions;
(c) laminating a volume hologram film on top of the document surface on which the relief information is applied and which is coated with the liquid monomer-containing adhesive; wherein the volume hologram film and the document surface are not in direct contact, and
(d) after a holding time, during which the adhesive monomers have diffused into the hologram film with different intensities in an area containing the relief information and the remaining area containing no relief information, whereby the difference in the monomer intensities caused the hologram to swell to different extents in different areas and have led to color change creating a diffractive information, curing the adhesive composite.

17. The method of any one of claim 1, claim 15, or claim 16, wherein the adhesive is applied by silk-screen or a doctor blade technique.

* * * * *